(12) United States Patent
Shimoyama

(10) Patent No.: US 7,164,216 B2
(45) Date of Patent: Jan. 16, 2007

(54) MOTOR

(75) Inventor: Takeshi Shimoyama, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 171 days.

(21) Appl. No.: 10/893,559

(22) Filed: Jul. 16, 2004

(65) Prior Publication Data

US 2005/0110351 A1 May 26, 2005

(30) Foreign Application Priority Data

Jul. 23, 2003 (JP) .............................. 2003-278219
Jul. 16, 2004 (JP) .............................. 2004-209378

(51) Int. Cl.
*H02K 37/24* (2006.01)

(52) U.S. Cl. .............................. 310/49 R; 310/156.08; 310/156.21; 310/156.36

(58) Field of Classification Search .............. 310/49 R, 310/49 A, 156.04, 156.05, 156.06, 156.08, 310/156.21, 156.36, 156.38, 156.45, 156.46, 310/156.74, 156.75, 257
See application file for complete search history.

(56) References Cited

U.S. PATENT DOCUMENTS 5,811,903 A * 9/1998 Ueno et al. .................... 310/90
6,031,304 A * 2/2000 Suzuki et al. ............. 310/49 R
6,479,911 B1 * 11/2002 Koike et al. .............. 310/49 R
6,489,696 B1 * 12/2002 Sashino et al. ................ 310/43
6,700,261 B1 * 3/2004 Mayumi ....................... 310/91

FOREIGN PATENT DOCUMENTS

JP           2003-333794           11/2003

* cited by examiner

*Primary Examiner*—Dang Le
(74) *Attorney, Agent, or Firm*—Hogan & Hartson LLP

(57) ABSTRACT

A motor includes a stator section with a two-phase structure having first and second stator assemblies disposed in an axial direction, and a plurality of pole teeth arranged at an electrical angle of 90 degrees along inner circumferences of the first and second stator assemblies, and a rotor section including a rotation shaft, and first and second permanent magnets that are disposed opposite to and spaced a predetermined gap from the pole teeth and affixed to the rotation shaft with a gap provided between the first and second permanent magnets in the axial direction. Each of the first and second permanent magnets has an effective section at an outer circumference thereof that has multiple poles alternately magnetized with N poles and S poles, and has a protruded section that has a diameter smaller than an outer diameter of the effective section and protrudes in the axial direction.

20 Claims, 5 Drawing Sheets

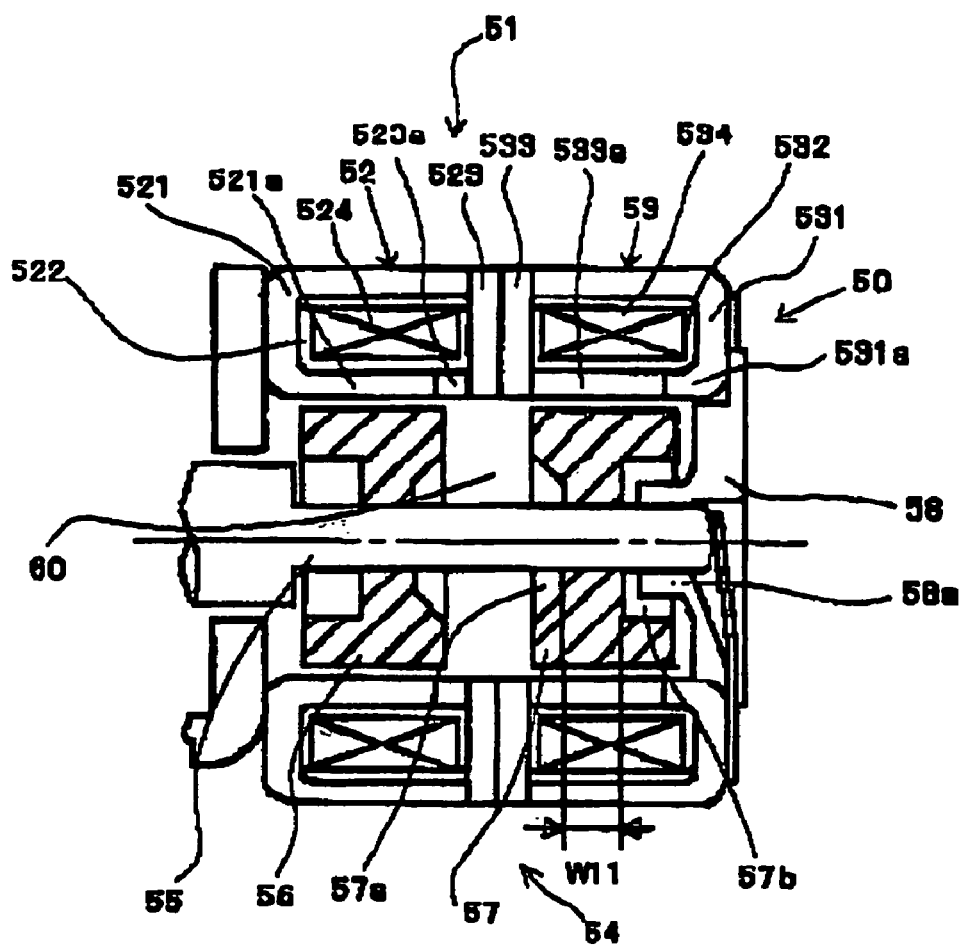
Fig.5 Prior

MOTOR

BACKGROUND OF THE INVENTION

1. Field of the Invention

The present invention relates to motors having a stator section equipped with first and second stator assemblies and a rotor section equipped with first and second permanent magnets respectively disposed opposite to the first and second stator assemblies.

2. Description of the Related Arts

Motors having a stator section equipped with first and second stator assemblies and a rotor section equipped with first and second permanent magnets respectively disposed opposite to the first and second stator assemblies are generally called PM (permanent magnet) type stepping motors.

The range of application of such PM type stepping motors has expanded as actuators for a variety of equipment because of their excellent controllability. In recent years, PM type stepping motors have been used in electronic equipment such as video cameras and digital cameras. In this connection, thinner and more miniaturized motors are in demand along with advances that are being made to improve the performance of various equipment.

One example of the type of motors described above is shown in FIG. 5. For example, a motor 50 shown in FIG. 5 has a stator section 51 equipped with a first stator assembly 52 and a second stator assembly 53, and a rotor section 54 equipped with first and second permanent magnets 56 and 57 respectively disposed opposite to the first and second stator assemblies 52 and 53.

The first and second permanent magnets 56 and 57 are generally formed by compression molding, which achieves a higher density than magnets formed by injection molding. Accordingly, the first and second permanent magnets 56 and 57 formed by compression molding can provide an excellent magnetic characteristic, better than magnets that are formed by injection molding.

Also, as shown in FIG. 5, the first and second permanent magnets 56 and 57 are affixed to a rotation shaft 55, with a gap 60 provided between them. More specifically, the first permanent magnet 56 is disposed opposite to pole teeth 521a and 523a of first outer and inner stator cores 521 and 523 that form the first stator assembly 52, and the second permanent magnet 57 is similarly disposed opposite to pole teeth 531a and 533a of second outer and inner stator cores 531 and 533 that form the second stator assembly 53.

By disposing the first and second permanent magnets 56 and 57 separated from each other, magnetic paths are not formed or difficult to be formed between the first permanent magnet 56 and the second outer and inner stator cores 531 and 533, or between the second permanent magnet 57 and the first outer and inner stator cores 521 and 523. As a result, leaks of magnetic fluxes are prevented, and the rotation performance of the motor 50 can be improved.

An adhesive retaining concave section 57a is formed at one end of the second permanent magnet 57. When the rotation shaft 55 and the second permanent magnet 57 are bonded with adhesive, an excess portion of the adhesive applied to the rotation shaft 55 is retained in the adhesive retaining concave section 57a, and the retained excess portion of the adhesive enhances the bonding force with the rotation shaft 55.

Also, a circular concave section 57b is formed at the other end of the second permanent magnet 57 around the rotation shaft 55 to receive a bearing section 58a of a radial bearing 58, in order to secure an effective bearing length, and reduce the thickness and the size of the motor 50.

However, if the motor size and the thickness of the motor 50 are reduced, the outer diameter of the rotation shaft 55 to which the first and second permanent magnets 56 and 57 are bonded becomes smaller, and the measurements in the axial direction of the first and second permanent magnets 56 and 57 become shorter. As a result, bonding areas of the permanent magnets 56 and 57, which are formed between inner circumferential surfaces of the first and second permanent magnets 56 and 57 and the outer circumferential surface of the rotation shaft 55, are reduced. The reduction in bonding areas leads to problems in that a sufficient bonding force cannot obtained between the first and second permanent magnets 56 and 57 and the rotation shaft 55, and the required perpendicularity of the first and second permanent magnets 56 and 57 with respect to the rotation shaft 55 cannot be obtained. As a result, variations occur in the gap between the outer circumferential surfaces of the first and second permanent magnets 56 and 57 and their opposing pole teeth 521a and 523a, and 531a and 533a. Consequently, variations are caused in the magnetic attraction force and magnetic repelling force between the first and second permanent magnets 56 and 57 and their opposing pole teeth 521a and 523a, and 531a and 533a, which results in problems of irregular rotation speed and deteriorated rotation performance of the motor 50.

Moreover, in the motor 50, the second permanent magnet 57 is formed with the circular concave section 57b to receive the bearing section 58a of the radial bearing 58 and the adhesive retaining concave section 57a to retain an excess portion of adhesive. As a result, a bonding overlap width W11 of the second permanent magnet 57 with respect to the rotation shaft 55 is substantially reduced. Accordingly, although the adhesive retaining concave section 57a that enhances the bonding force is formed, it is difficult to obtain a sufficient bonding force or a required perpendicularity.

In order to secure a long bonding overlap width W11, the first and second permanent magnets 56 and 57 may be formed in one piece without being separated into a single permanent magnet, and the single permanent magnet may be bonded to the rotation shaft 55 to form a rotor section. If this structure is adapted, leaks of magnetic fluxes, which may occur between the first permanent magnet 56 and the second outer and inner stator cores 531 and 533 and between the second permanent magnet 57 between the first outer and inner stator cores 521 and 523 as described above, need to be prevented. To achieve this, for example, a concave section may be formed in the outer circumferential surface of the permanent magnet in a portion that corresponds to the gap 60 in FIG. 5.

However, the permanent magnet is formed by a compression molding method in which a mixture of magnetic powder of high density and binder is filled in a metal mold of a compression molding machine and compressed by a press machine, thereby hardening the molded body.

Due to the physical property of the mixture, its flow ability is poor, and therefore a problem arises in that a metal mold having a complex shape cannot be completely filled with the mixture, and it is difficult for the press machine to apply a uniform pressure to areas formed in the concave section.

To address the problems described above, when a concave section is to be formed in the outer circumferential surface of the permanent magnet, a cylindrical body having a uniform outer diameter may first be formed by compression molding, and then a required portion for the concave section is formed by cutting. However, this method leads to problems of an increased number of manufacturing steps and a higher cost.

SUMMARY OF THE INVENTION

It is an object of the present invention to provide a motor that can improve the bonding strength and perpendicularity of permanent magnets with respect to a rotation shaft of the motor, while maintaining the required rotation performance, thinness and compactness of the motor.

A motor in accordance with an embodiment of the present invention includes a stator section having a two-phase structure in which plural comb-shaped pole teeth arranged along inner circumferences of first and second stator assemblies are disposed in an axial direction at an electrical angle of 90 degrees, and a rotor section having first and second permanent magnets that are disposed opposite to and spaced a predetermined gap from the pole teeth and bonded to the rotation shaft with a gap provided therebetween in the axial direction. In one aspect, each of the first and second permanent magnets is formed by compression molding, and has an effective section at an outer circumferential side thereof that has multiple poles alternately magnetized with N poles and S poles, and a protruded section that has a diameter smaller than an outer diameter of the effective section and protrudes in the axial direction.

In accordance with the embodiment of the present invention, the first and second permanent magnets are formed by compression molding, and therefore have a high magnetic density, and the motor having such first and second permanent magnets can attain an excellent magnetic characteristic. Also, because the first and second permanent magnets are equipped with the protruded sections, the protruded sections can be used as bonding overlap widths. Alternatively, when adhesive retaining concave sections are to be formed in the first and second permanent magnets, such adhesive retaining concave sections can be formed in the protruded sections. As a result, portions of the first and second permanent magnets where adhesive retaining concave sections would be conventionally formed can be used as bonding overlap widths between the permanent magnets and the rotation shaft. For this reason, bonding areas formed by the inner circumferential surfaces of the permanent magnets and the outer circumferential surface of the rotation shaft can be made greater compared with the conventional structure without the protruded sections. Accordingly, the bonding strength between the permanent magnets and the rotation shaft can be increased, and the perpendicularity of the permanent magnets with respect to the rotation shaft can be improved.

Moreover, in accordance with the embodiment of the present invention, the protruded section is formed with a diameter smaller than the outer diameter of the effective section. Accordingly, when the first permanent magnet is disposed on the inner circumferential side of the first stator assembly, and the second permanent magnet is disposed on the inner circumferential side of the second stator assembly, a magnetic path is not formed or difficult to be formed between the first stator assembly and the protruded section of the second permanent magnet, such that leaks of magnetic flux can be prevented. Also, a magnetic path is not formed or difficult to be formed between the second stator assembly and the protruded section of the first permanent magnet, such that leaks of magnetic flux can be prevented.

Also, in accordance with an embodiment of the present invention, the protruded sections that are formed in the first and second permanent magnets may be disposed opposite to each other in the axial direction. As a result, the protruded sections can be disposed in a space between the first and second permanent magnets which would otherwise be wasted as a dead space, such that the motor can be made thinner and smaller without changing its measurement in the axial direction, and a required bonding strength can be obtained.

Also, in accordance with an embodiment of the present invention, the permanent magnets may include adhesive retaining concave sections, that retain an excess portion of adhesive to be coated on the permanent magnets or the rotation shaft, formed around the rotation shaft. For this reason, when the permanent magnets and the rotation shaft are bonded with adhesive, an excess portion of the adhesive coated would not be spread into the surrounding areas. Also, the adhesive retained in the adhesive retaining concave sections enhances the bonding force between the rotation shaft and the permanent magnets.

Furthermore, in accordance with an embodiment of the present invention, the permanent magnet may include a circular concave section, that receives a bearing section for rotatably supporting the rotation shaft in a radial direction, formed in an end face thereof on the opposite side in the axial direction of the protruded section. As a result, the measurement in the axial direction of the motor can be shortened, and therefore the motor can be made thinner and smaller.

In the motor in accordance with the present invention, the first and second permanent magnets are equipped with the protruded sections, and the protruded sections can be used as bonding overlap widths. Alternatively, when adhesive retaining concave sections are to be formed in the first and second permanent magnets like the conventional one, such adhesive retaining concave sections can be formed in the protruded sections, such that portions where the adhesive retaining concave sections would be conventionally formed can be used as bonding overlap widths. For this reason, bonding areas formed by the inner circumferential surfaces of the permanent magnets and the outer circumferential surface of the rotation shaft can be made greater than those of the conventional one. Accordingly, the bonding strength between the permanent magnets and the rotation shaft can be improved, and the perpendicularity of the permanent magnets with respect to the rotation shaft can be improved.

Moreover, in accordance with the present invention, the protruded section is formed with a diameter smaller than the outer diameter of the effective section. Accordingly, when the first permanent magnet is disposed on the inner circumferential side of the first stator assembly, and the second permanent magnet is disposed on the inner circumferential side of the second stator assembly, a magnetic path is not formed or difficult to be formed between the first stator assembly and the protruded section of the second permanent magnet, such that leaks of magnetic flux can be prevented. Also, a magnetic path is not formed or difficult to be formed between the second stator assembly and the protruded section of the first permanent magnet, such that leaks of magnetic flux can be prevented. As a result, although the permanent magnet is equipped with the protruded section, the rotation performance of the motor can be prevented from being lowered.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 5 is a cross-sectional view of a conventional motor.

PREFERRED EMBODIMENTS OF THE INVENTION

Motors in accordance with embodiments of the present invention are described below with reference to the accompanying drawings.

Figure 1:
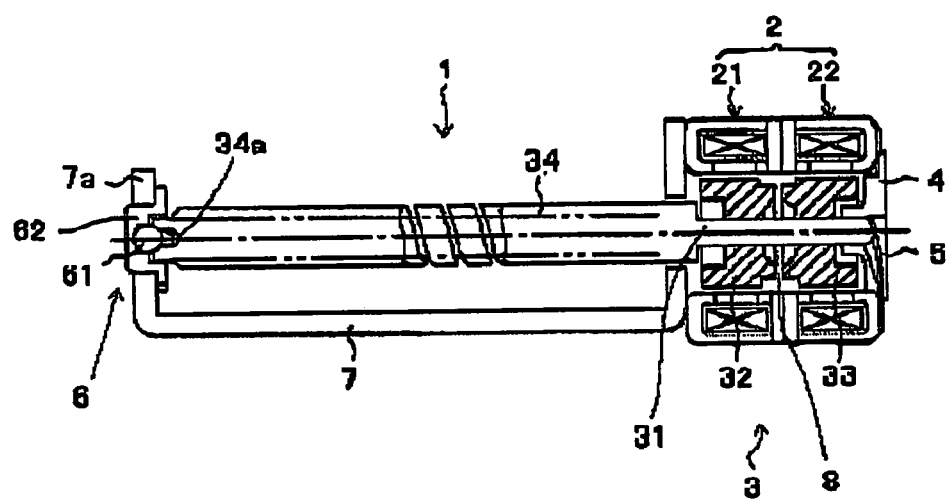
FIG. 1 is a longitudinal cross-sectional view of a motor in accordance with an embodiment of the present invention.
Figure 2:
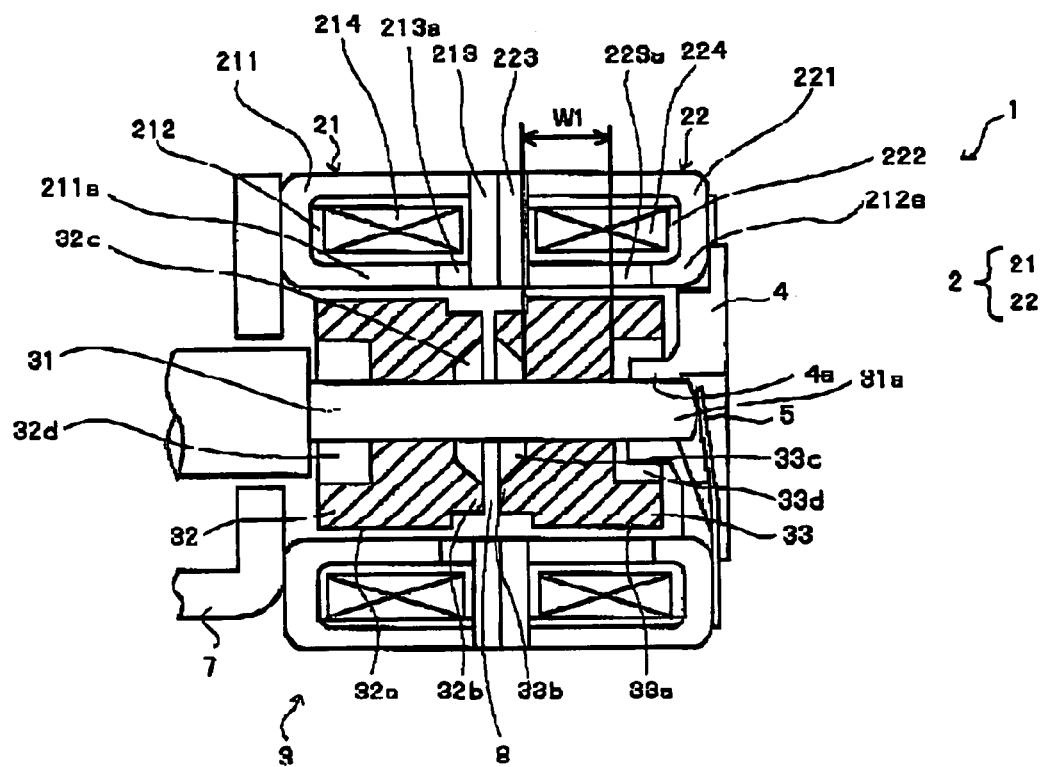
FIG. 2 is a longitudinal cross-sectional view of a main portion of the motor shown in FIG. 1.
Figure 3:
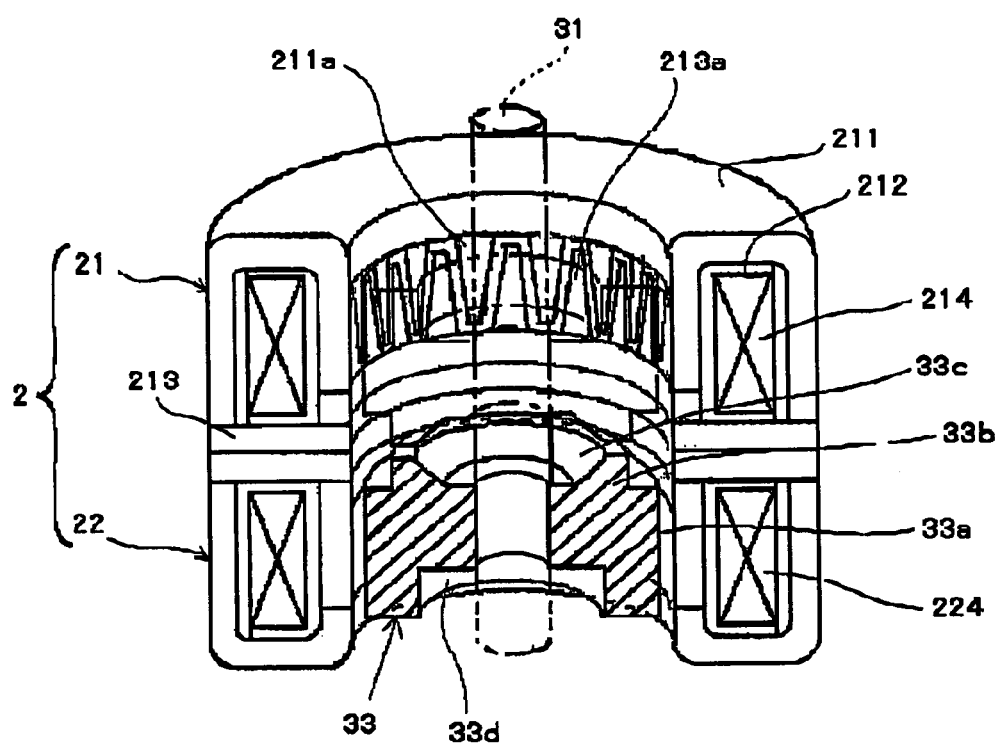
FIG. 3 is a perspective view showing a cross section of a stator section and a rotor section of the motor shown in FIG. 1.

FIG. 1 is a longitudinal cross-sectional view of a motor 1 in accordance with an embodiment of the present invention. FIG. 2 is a longitudinal cross-sectional view of a main portion of the motor 1 shown in FIG. 1. FIG. 3 is a perspective view showing a cross section of a stator section and a rotor section of the motor 1 shown in FIG. 1.

The motor 1 shown in FIG. 1 is a PM (permanent magnet) type stepping motor that may be used in digital equipment such as video cameras and digital cameras.

The motor 1 is formed from a stator section 2 having a two-phase structure with first and second stator assemblies 21 and 22 and a rotor section 3. The stator section 2 includes plural comb-shaped pole teeth 211a, 213a, 221a and 223a arranged respectively along inner circumferences of the first and second stator assemblies 21 and 22 disposed in an axial direction at an electrical angle of 90 degrees. The rotor section 3 includes first and second permanent magnets 32 and 33 that are disposed opposite to and spaced a predetermined gap from the pole teeth 211a, 213a, 221a and 223a and bonded to a rotation shaft 31 with a gap 8 provided therebetween in the axial direction.

The stator section 2 is formed from the first stator assembly 21 and the second stator assembly 22, which are disposed overlapped each other as viewed in an axial direction of the rotation shaft 31 to define a two-phase structure, as shown in FIG. 1 and FIG. 2.

The first stator assembly 21 is formed from a first outer stator core 211, an annular first bobbin 212 with a coil 214 wound thereabout, and a first inner stator core 213. The first bobbin 212 is interposed between the first inner stator core 213 and the first outer stator core 211.

Also, an outer circumferential portion of the first outer stator core 211 defines a part of a motor case.

Further, the first outer stator core 211 and the first inner stator core 213 are formed with the plural pole teeth 211a and 213a in a comb teeth shape, respectively. The pole teeth 211a and 213a are alternately arranged along an inner circumferential surface of the first bobbin 212 in a manner to surround a first permanent magnet 32.

Similarly, the second stator assembly 22 is formed from a second outer stator core 221, an annular second bobbin 222 with a coil 224 wound thereabout, and a second inner stator core 223. The second bobbin 222 is interposed between the second inner stator core 223 and the second outer stator core 221. Also, an outer circumferential portion of the second outer stator core 221 is commonly used as the motor case.

Further, the plural comb teeth shaped pole teeth 221a formed in the second outer stator core 221 and the plural comb teeth shaped pole teeth 223a formed in the second inner stator core 223 are alternately arranged along an inner circumferential surface of the second bobbin 222 in a manner to surround a second permanent magnet 33.

Also, the first stator assembly 21 and the second stator assembly 22 are bonded back to back together.

More specifically, an end surface of the first inner stator core 213 and an end surface of the second inner stator core 223 are bonded together, and the first inner stator core 213, the first bobbin 212 and the first outer stator core 211 are disposed in the axial direction in this order, and the second inner stator core 223, the second bobbin 222 and the second outer stator core 221 are disposed in a similar manner.

Moreover, the first and second stator assemblies 21 and 22 are disposed to have a two-phase structure in which the first and second stator assemblies 21 and 22 are arranged in the axial direction at an electric angle of 90 degrees. More specifically, the pole teeth 211a and 213a of the first outer and inner stator cores 211 and 213, and the pole teeth 221a and 223a of the second outer and inner stator cores 221 and 223 are disposed with their phases shifted by ¼ of the pitch of the pole teeth.

The frame 7 may generally have a cross section of a channel shape, and a base end side of the channel shape of the frame 7 is affixed to an end surface of the first outer stator core 211, and a standing section 7a is formed at the other end side of the frame 7.

The rotor section 3 is formed from the rotation shaft 31, and the first and second permanent magnets 32 and 33 that are affixed to the rotation shaft 31, wherein the permanent magnets 32 and 33 are disposed on the rotation shaft 31 with the gap 8 provided therebetween in the axial direction.

Also, the rotor section 3 is provided on the side of a base end section 31a (an opposite side of an output end) of the rotation shaft 31, and is provided in a manner that its output end side substantially protrudes, wherein a lead screw section 34 is formed on the protruded section.

The lead screw section 34 formed on the rotation shaft 31 generally has a structure and functions that are similar to those of a conventionally known lead screw. For example, the lead screw section 34 has a function to move a moving member to be fed (omitted in the figure) that engages the lead screw section 34 in the axial direction (thrust direction) with the rotation of the rotation shaft 31. It is noted that the moving direction of the moving member to be fed is controlled by switching the direction of rotation of the rotation shaft 31.

The base end section 31a of the rotation shaft 31 is rotatably supported by a bearing section 4a of a radial bearing 4. The radial bearing may be formed with resin having lubricating property, and the base end section 31a of the rotation shaft 31 is pushed by a leaf spring 5 in the direction of the output end thereof.

On the other hand, the lead screw section 34 formed on the rotation shaft 31 is rotatably supported by a bearing 6 that is disposed at the standing section 7a of the frame 7. The bearing 6 may be press-fitted in a recess or a hole formed in the standing section 7a of the frame 7.

The bearing 6 may be formed from a ball 61 that abuts against an engaging hole 34a formed at an end section of the lead screw 34, and a ball retaining member 62 that retains the ball 61.

Next, the first and second permanent magnets 32 and 33 are described. In accordance with the present embodiment, the first and second permanent magnets 32 and 33 are in the same shape. Accordingly, the second permanent magnet 33 is described, and the description of the first permanent magnet 32 is omitted. It is noted that, by forming the first and second permanent magnets 32 and 33 in the same shape, only one type of formed parts may suffice, such that an increase in the number of parts can be prevented, and the cost of the motor can be lowered.

The second permanent magnet 33 can be a magnet that is formed by compression molding. The second permanent magnet 33 may be composed of a Nd—Fe—B based rare earth permanent magnet, wherein magnetic powder essentially composed of Nd—Fe—B is mixed with a binder material such as resin or the like, and is formed in a generally cylindrical shape by compression molding, using a metal mold not shown.

The Nd—Fe—B based rare earth permanent magnet formed by compression molding can be filled with magnetic powder at a high density. Accordingly, the second permanent magnet 33 can have a higher density, and thus a more excellent magnetic characteristic, compared to those formed by injection molding. As a result, the motor 1 can be made thinner and smaller, and can provide a relatively high output.

The second permanent magnet 33 has an effective section 33a whose outer circumference surface has multiple poles alternately magnetized with N poles and S poles, and is disposed opposite to the plurality of pole teeth 221a and 223a in the comb teeth shape provided on the second outer and inner stator cores 221 and 223, respectively, and a protruded section 33b that protrudes in the axial direction from the effective section 33a, and has a diameter smaller than the outer diameter of the effective section 33a.

The effective section 33a of the second permanent magnet 33 defines a circumferential surface (region) that is disposed opposite to the plurality of pole teeth 221a and 223a with a minute gap provided between them, and in the region of the effective section 33a is formed a magnetic path between the second permanent magnet 33 and the opposing pole teeth 221a and 223a, where a magnetic flux is generated. As a result, the first and second permanent magnets 32 and 33 are forced to rotate.

The protruded section 33b is formed in a generally circular ring shape at one end face (an inner end face that is opposite to the first permanent magnet 32) of the second permanent magnet 33, in a manner to protrude in a stepwise fashion toward the side of the first permanent magnet 32. In other words, the effective section 33b can be said to terminate at the inner end face thereof, and the protruded section 33b protrudes from the inner end face of the second permanent magnet 33 toward the side of the first permanent magnet 32. Also, a recessed corner section is formed in the outer circumference of the permanent magnet 33 on the side of its inner end face because of the protruded section 33b.

Further, the protruded section 33b is formed to have a diameter smaller than that of the effective section 33a, such that a gap between the outer circumference of the protruded section 33b and the opposing pole teeth 221a and 223a is greater than the gap between the effective section 33a and the pole teeth 221a and 223a.

Also, in accordance with the present embodiment, an adhesive retaining concave section 33c may be formed in the protruded section 33b around the rotation shaft 31.

The adhesive retaining concave section 33c may be formed in a manner to be contained in the protruded section 33b, such that the adhesive retaining concave section 33c may not extend into the effective section 33a, like the conventional structure shown in FIG. 5. In other words, the adhesive retaining concave section 33c may be shallower than the height of the protruded section 33b in the axial direction.

Also, on the other end (on the side of the base end section 31a of the rotation shaft 31) of the second permanent magnet 33 is formed a circular concave section 33d around the rotation shaft 31, which receives the bearing section 4a of the radial bearing 4.

The first permanent magnet 32 and the second permanent magnet 33 are affixed to the rotation shaft 31 with adhesive in a manner that the protruded sections 32b and 33b are placed opposite to each other in the axial direction.

As shown in FIG. 2, the measurement in the axial direction of a shaft hole provided in the second permanent magnet 33 that is to be affixed to the rotation shaft 31, in other words, a bonding overlap width W1 is greater than the bonding overlap width W11 shown in FIG. 5 because the second permanent magnet 33 is equipped with the protruded section 33b. In other words, because the adhesive retaining concave section 33c is formed in the protruded section 33b, an inner circumferential side portion of the effective section, that would conventionally be used as an adhesive retaining concave section, can be used as a bonding overlap width for the rotation shaft 31. Alternatively, when the depth of the adhesive retaining concave section 33c in the axial direction is shorter than the length of the protruded section 33b in the axial direction, a part of the inner circumference surface of the protruded section 33b can be used as a bonding overlap width for the rotation shaft 31. As a result, the bonding area formed by the inner circumference surface of the second permanent magnet 33 and the outer circumference surface of the rotation shaft 31 increases, and the bonding strength becomes greater.

Also, an excess portion of the adhesive that is applied to the second permanent magnet 33 or the rotation shaft 31 can be retained by the adhesive retaining concave section 33c without spreading into the surrounding areas. Further, the bonding force between the rotation shaft 31 and the second permanent magnet 33 is enhanced by the adhesive that is retained in the adhesive retaining concave section 33c.

If the adhesive flows out into the circular concave section 33d formed in the second permanent magnet 33, the adhesive may adhere to the bearing section 4a and the rotation shaft 31 that is freely rotatably supported by the bearing section 4a, such that the rotation shaft 31 may be locked. Accordingly, the position and the amount of the adhesive to be applied are controlled, so as not to overflow into the circular concave section 33d.

Further, the end surface of the second permanent magnet 33 where the circular concave section 33d is formed defines a surface for positioning the second stator assembly 22, and the end surface of the first permanent magnet 32 where the protruded section 32d is formed defines a surface for positioning the first stator assembly 21.

The permanent magnets 32 and 33 are positioned by a jig, and an adhesive is applied to the rotation shaft 31, thereby bonding the permanent magnets 32 and 33 to the rotation shaft 31. In this manner, the first and second permanent magnets 32 and 33 are spaced a distance from each other in the axial direction and affixed to the rotation shaft 31, such that the first and second permanent magnets 32 and 33 can be affixed to the rotation shaft 31 with a high positioning accuracy while avoiding variations in the component accuracy that may be caused at the time of forming the first and second permanent magnets 32 and 33.

(Effects of the Present Embodiment)

In the motor 1 in accordance with the present embodiment, the first and second permanent magnets 32 and 33 are formed by compression molding, and therefore have a high magnetic density, and the motor 1 can achieve a high level of magnetic characteristic. Also, because the first and second permanent magnets 32 and 33 are equipped with the protruded sections 32b and 33b, the adhesive retaining concave sections 32c and 33c can be formed in the protruded sections 32b and 33b, and inner circumferential side portions of the effective sections, that would conventionally be used as adhesive retaining concave sections, can be used as bonding overlap widths for the rotation shaft 31. Alternatively, when the depth of the adhesive retaining concave section 33c in the axial direction is shorter than the length of the protruded section 33b in the axial direction, a part of the inner circumference surface of the protruded section 33b can be used as a bonding overlap width for the rotation shaft 31. For this reason, bonding areas formed by the inner circumferential surfaces of the first and second permanent magnets 32 and 33 and the outer circumferential surface of the rotation shaft 31 can be made greater than those of the conventional one without protruded sections. Accordingly, the bonding strength between the permanent magnets 32 and 33 and the rotation shaft 31 can be increased, and the perpendicularity of the permanent magnets 32 and 33 with respect to the rotation shaft 31 can be improved.

Moreover, the protruded sections 32b and 33b are formed with a diameter smaller than the outer diameter of the effective sections 32a and 33a. Accordingly, a magnetic path is not formed or difficult to be formed between the first stator assembly 21 and the protruded section 33b of the second permanent magnet 33, such that leaks of magnetic flux from the second permanent magnet 33 side can be prevented. Also, a magnetic path is not formed or difficult to be formed between the second stator assembly 22 and the protruded section 32b of the first permanent magnet 32, such that leaks of magnetic flux from the first permanent magnet 32 side can be prevented.

Also, the protruded sections 32b and 33b are disposed opposite to each other in the axial direction. As a result, the protruded sections 32b and 33b can be disposed in a space (the gap 60 in FIG. 5) between the first and second permanent magnets 32 and 33, which would conventionally be a dead space, such that the motor 1 can be made thinner and smaller and a required bonding strength can be obtained without changing the size of the motor 1 in the axial direction.

Also, in the motor 1, the first and second permanent magnets 32 and 33 include the adhesive retaining concave sections 32c and 33c, that retain an excess portion of adhesive to be applied to the permanent magnets 32 and 33 or the rotation shaft 31, formed around the rotation shaft 31. For this reason, the excess portion of the adhesive applied can be retained without spreading in the surrounding areas, and the adhesive retained therein enhances the bonding force.

Further, the adhesive retaining concave sections 32c and 33c are formed to be contained in the protruded sections 32b and 33b, and they do not extend into the effective portions 32a and 33a, like the conventional technology. Accordingly, the bonding area can be made greater compared to the conventional structure.

Moreover, because the adhesive retaining concave sections 32c and 33c and the circular concave sections 32d and 33d are formed in the first and second permanent magnets 32 and 33, the first and second permanent magnets 32 and 33 become relatively light. As a result, the moment of inertia of the first and second permanent magnets 32 and 33 is reduced, thereby improving the starting of the motor 1.

(Other Embodiments)

The embodiment described above is one of preferred exemplary embodiments of the present invention, and does not limit the present invention, and a variety of changes can be made and implemented without departing from the subject matter of the present invention.

Figure 4:
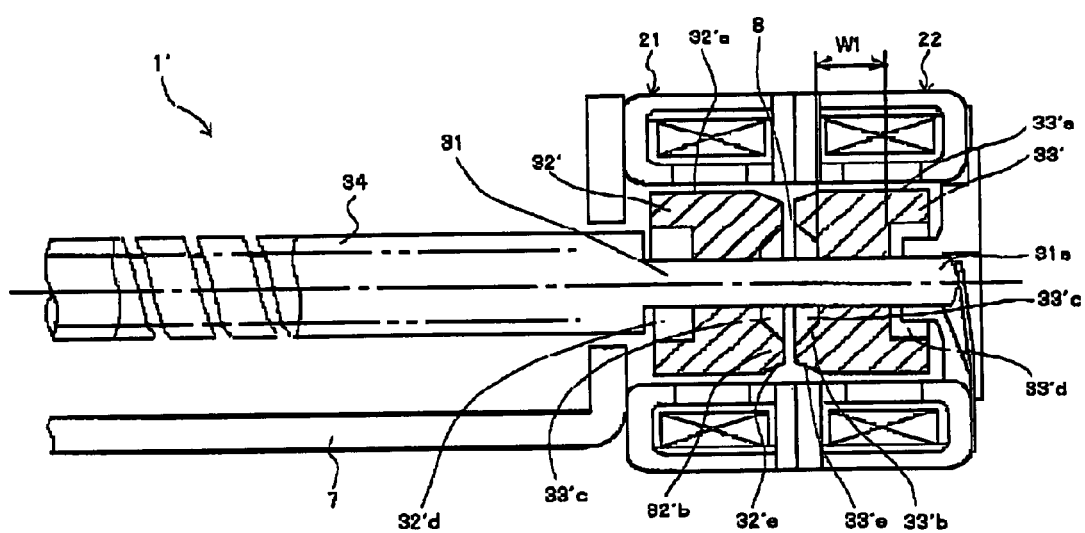
FIG. 4 is a cross-sectional view of a main portion of a motor in accordance with another embodiment of the present invention.

FIG. 4 is a cross-sectional view of main portions of a motor in accordance with another embodiment of the present invention.

First and second permanent magnets 32' and 33' have protruded sections 32'b and 33'b whose shape is different from that of the embodiment described above. More specifically, each of the protruded sections 32'a and 33'a is formed to have a tapered configuration (tapered surface 32'e and 33'e) in which its diameter is gradually reduced in the axial direction from each of respective effective portions 32'a and 33'a. As a result, the outer circumference of each of the protruded sections 32'b and 33'b is gradually separated from the inner circumference of each of the first and second stator assemblies 21 and 22, respectively.

With the first and second permanent magnets 32' and 33' thus structured, the gap between the tapered configurations (the tapered surfaces 32'e and 33'e) of the protruded sections 32'b and 33'b and pole teeth 211a and 213a and pole teeth 221a and 223a arranged along the inner circumference of the first and second stator sections 21 and 22, respectively, becomes greater than the gap between the effective sections 32'a and 33'a and the pole teeth 211a and 213a and the pole teeth 221a and 223a, respectively, such that a magnetic path is not formed or difficult to be formed between the first stator assembly 21 and the protruded section 33'b of the second permanent magnet 33'. Also, a magnetic path is not formed or difficult to be formed between the second stator assembly 22 and the protruded section 32'b of the first permanent magnet 32'. As a result, leaks of magnetic fluxes can be prevented, and the rotation characteristics of the motor 1 can be maintained without being affected by the provision of the protruded sections 32'b and 33'b on the permanent magnets 32' and 33'.

In the present embodiment, the protruded section is in a circular ring shape, but can be formed in a non-circular shape so long as the rotation of the motor is not unbalanced. Also, in FIGS. 1 and 2, the protruded sections 32a and 33a are disposed opposite to each other in the axial direction, but the arrangement of the protruded sections 32a and 33a is not limited to this particular embodiment. Moreover, the circular concave section 32d may not be formed in the first permanent magnet 32, and a portion of the first permanent magnet 32 corresponding to the circular concave section 32d may be added as a bonding overlap width with the rotation shaft 31. Also, a non-magnetic intermediate member may be placed in the gap 8 between the protruded sections 32a and 33a, such that the first and second permanent magnets 32 and 33 may be bonded together in one piece.

Furthermore, depending on the assembly method, the adhesive retaining concave sections 32c and 33c may not necessarily be provided. In such a case, the protruded sections 32b and 33b can be directly used as bonding overlap widths. Accordingly, the bonding areas formed between the inner circumference surfaces of the first and second permanent magnets 32 and 33 and the outer circumference surface of the rotation shaft 31 can be made greater compared with the conventional one, the bonding strength can be improved, and the perpendicularity with respect to the rotation shaft 31 can be improved.

INDUSTRIAL APPLICABILITY

The present invention is applicable to PM (permanent magnet) type stepping motors that are used for video cameras, digital cameras and the like. As examples of other applications, the present invention is applicable to optical information storage devices such as CD, DVD and the like, information storage devices using magnetic storage medium such as flexible disks, and driving power sources for various equipment, devices, machines and the like.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
a stator section with a two-phase structure having first and second stator assemblies; and
a rotor section including a rotation shaft, and first and second permanent magnets that are disposed opposite to the first and second stator assemblies, respectively, and affixed to the rotation shaft with a gap provided between the first and second permanent magnets in an axial direction of the rotation shaft,
wherein at least one of the first and second permanent magnets has an effective section at an outer circumference thereof having multiple poles alternately magnetized with N poles and S poles, and a protruded section that has a diameter smaller than an outer diameter of the effective section and protrudes in the axial direction, and
wherein the at least one of the first and second permanent magnets includes an inner end face that is opposite to the other of the first and second permanent magnets in the axial direction, and the effective section of at least one of the first and second permanent magnets terminates at the inner end face, and the protruded section protrudes from the inner end face in the axial direction.

2. A motor according to claim 1, wherein the protruded section of the at least one of the first and second permanent magnets is disposed opposite to another of the first and second permanent magnets in the axial direction.

3. A motor according to claim 1, wherein the protruded section of at least one of the first and second permanent magnets includes an adhesive retaining concave section.

4. A motor according to claim 3, wherein the adhesive retaining concave section does not extend into the effective section in the axial direction.

5. A motor according to claim 3, wherein the adhesive retaining concave section is shallower than the protruded section in the axial direction.

6. A motor according to claim 1, further comprising a bearing section for rotatably supporting the rotation shaft in a radial direction, wherein at least one of the first and second permanent magnets includes a circular concave section, that receives the bearing section, formed in an end face thereof on the opposite side in the axial direction of the protruded section.

7. A motor comprising:
a stator section with a two-phase structure having first and second stator assemblies; and
a rotor section including a rotation shaft, and first and second permanent magnets that are disposed opposite to the first and second stator assemblies, respectively, and affixed to the rotation shaft with a gap provided between the first and second permanent magnets in an axial direction of the rotation shaft,
wherein at least one of the first and second permanent magnets has an effective section at an outer circumference thereof having multiple poles alternately magnetized with N poles and S poles, and a protruded section that has a diameter smaller than an outer diameter of the effective section and protrudes in the axial direction, and
wherein the protruded section has an outer circumference having a diameter smaller than the outer diameter of the effective section.

8. A motor comprising:
a stator section with a two-phase structure having first and second stator assemblies; and
a rotor section including a rotation shaft, and first and second permanent magnets that are disposed opposite to the first and second stator assemblies, respectively, and affixed to the rotation shaft with a gap provided between the first and second permanent magnets in an axial direction of the rotation shaft,
wherein at least one of the first and second permanent magnets has an effective section at an outer circumference thereof having multiple poles alternately magnetized with N poles and S poles, and a protruded section that has a diameter smaller than an outer diameter of the effective section and protrudes in the axial direction, and
wherein the outer circumference of the protruded section has a sloped surface.

9. A motor comprising:
a stator section with a two-phase structure having first and second stator assemblies disposed in an axial direction, and a plurality of pole teeth arranged along inner circumferences of the first and second stator assemblies, wherein pole teeth of the first stator assembly are offset from pole teeth of the second stator assembly by an electrical angle of 90 degrees; and
a rotor section including a rotation shaft, and first and second permanent magnets that are disposed opposite to and spaced a predetermined gap from the pole teeth and affixed to the rotation shaft with a gap provided between the first and second permanent magnets in the axial direction,
wherein each of the first and second permanent magnets has an effective section at an outer circumference thereof that has multiple poles alternately magnetized with N poles and S poles, and at least one of the first and second permanent magnets has a protruded section that has a diameter smaller than an outer diameter of the effective section and protrudes in the axial direction, and
wherein at least one of the first and second permanent magnets includes an inner end face that is opposite to the other of the first and second permanent magnets in the axial direction, and the effective section of at least one of the first and second permanent magnets terminates at the inner end face, and the protruded section protrudes from the inner end face in the axial direction.

10. A motor according to claim 9, wherein the protruded section of the first and second permanent magnets are disposed opposite to each other in the axial direction.

11. A motor according to claim 9, wherein the protruded section of the at least one of the first and second permanent magnets is disposed opposite to another of the first and second permanent magnets in the axial direction.

12. A motor according to claim 9, wherein the protruded section of at least one of the first and second permanent magnets includes an adhesive retaining concave section.

13. A motor according to claim 12, wherein the adhesive retaining concave section does not extend into the effective section in the axial direction.

14. A motor according to claim 12, wherein the adhesive retaining concave section is shallower than the protruded section in the axial direction.

15. A motor according to claim 9, further comprising a bearing section for rotatably supporting the rotation shaft in a radial direction, wherein at least one of the first and second permanent magnets includes a circular concave section, that receives the bearing section, formed in an end face thereof on the opposite side in the axial direction of the protruded section.

16. A motor comprising:
a stator section with a two-phase structure having first and second stator assemblies disposed in an axial direction, and a plurality of pole teeth arranged along inner circumferences of the first and second stator assemblies, wherein pole teeth of the first stator assembly are offset from pole teeth of the second stator assembly by an electrical angle of 90 degrees; and
a rotor section including a rotation shaft, and first and second permanent magnets that are disposed opposite to and spaced a predetermined gap from the pole teeth and affixed to the rotation shaft with a gap provided between the first and second permanent magnets in the axial direction,
wherein each of the first and second permanent magnets has an effective section at an outer circumference thereof that has multiple roles alternately magnetized with N poles and S poles, and at least one of the first and second permanent magnets has a protruded section that has a diameter smaller than an outer diameter of the effective section and protrudes in the axial direction, and
wherein the protruded section has an outer circumference having a diameter smaller than the outer diameter of the effective section.

17. A motor comprising:
a stator section with a two-phase structure having first and second stator assemblies disposed in an axial direction, and a plurality of pole teeth arranged along inner circumferences of the first and second stator assemblies, wherein pole teeth of the first stator assembly are offset from pole teeth of the second stator assembly by an electrical angle of 90 degrees; and
a rotor section including a rotation shaft, and first and second permanent magnets that are disposed opposite to and spaced a predetermined gap from the pole teeth and affixed to the rotation shaft with a gap provided between the first and second permanent magnets in the axial direction,
wherein each of the first and second permanent magnets has an effective section at an outer circumference thereof that has multiple poles alternately magnetized with N poles and S poles, and at least one of the first and second permanent magnets has a protruded section that has a diameter smaller than an outer diameter of the effective section and protrudes in the axial direction, and
wherein the outer circumference of the protruded section has a sloped surface.

18. A motor comprising:
a stator section with a two-phase structure having first and second stator assemblies; and
a rotor section including a rotation shaft, and first and second permanent magnets that are disposed opposite to the first and second stator assemblies, respectively, and affixed to the rotation shaft with a gap provided between the first and second permanent magnets in an axial direction of the rotation shaft,
wherein each of the first and second permanent magnets has an effective section at an outer circumference that is alternately magnetized with N poles and S poles, and a recessed corner section in the outer circumference adjacent to an opposing one of the first and second permanent magnets.

19. A motor according to claim 18, wherein each of the first and second permanent magnets has a protruded section that has a diameter smaller than an outer diameter of the effective section and protrudes in the axial direction.

20. A motor according to claim 18, wherein the protruded sections are disposed opposite to each other in the axial direction.

* * * * *